United States Patent
Klein et al.

(10) Patent No.: US 12,190,078 B2
(45) Date of Patent: Jan. 7, 2025

(54) ROUNDING HEXADECIMAL FLOATING POINT NUMBERS USING BINARY INCREMENTORS

(71) Applicant: INTERNATIONAL BUSINESS MACHINES CORPORATION, Armonk, NY (US)

(72) Inventors: Michael Klein, Schoenaich (DE); Petra Leber, Ehningen (DE); Cedric Lichtenau, Stuttgart (DE); Stefan Payer, Stuttgart (DE); Kerstin Claudia Schelm, Stuttgart (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 28 days.

(21) Appl. No.: 17/705,036

(22) Filed: Mar. 25, 2022

(65) Prior Publication Data
US 2023/0315386 A1    Oct. 5, 2023

(51) Int. Cl.
*G06F 7/499* (2006.01)
*G06F 7/483* (2006.01)

(52) U.S. Cl.
CPC ........ *G06F 7/49947* (2013.01); *G06F 7/4836* (2013.01); *G06F 2207/3844* (2013.01)

(58) Field of Classification Search
CPC .... G06F 7/49947; G06F 7/483; G06F 7/4836; G06F 7/49936; G06F 7/491; G06F 5/01; G06F 2207/3844
See application file for complete search history.

(56) References Cited

U.S. PATENT DOCUMENTS 5,373,461 A * 12/1994 Bearden .......... G06F 7/485 708/205
5,781,464 A * 7/1998 Mehta ............ G06F 7/5055 708/496
5,917,741 A    6/1999 Ng
(Continued)

FOREIGN PATENT DOCUMENTS

CN    1619484 A    5/2005
CN    111767516 A    10/2020

OTHER PUBLICATIONS

E. M. Schwarz, R. M. Smith and C. A. Krygowski, "The S/390 G5 floating point unit supporting hex and binary architectures," Proceedings 14th IEEE Symposium on Computer Arithmetic (Cat. No. 99CB36336), Adelaide, SA, Australia, 1999, pp. 258-265, doi: 10.1109/ARITH.1999.762852. (Year: 1999).*

(Continued)

*Primary Examiner* — Andrew Caldwell
*Assistant Examiner* — Carlo Waje
(74) *Attorney, Agent, or Firm* — Randy Emilio Tejeda

(57) ABSTRACT

Rounding hexadecimal floating point numbers using binary incrementors, including: incrementing, by a first incrementor, a first subset of bits of an operand comprising a binary hexadecimal floating point operand; incrementing, by a second incrementor, a second subset of bits of the operand; generate an intermediate result based on a carryout of the second incrementor; and generate an incremented result based on a carryout of the first incrementor and one or more of: a first bit of the intermediate result or the carryout of the second incrementor.

20 Claims, 9 Drawing Sheets

(56) References Cited

U.S. PATENT DOCUMENTS

| | | | |
|---|---|---|---|
| 6,175,847 | B1 | 1/2001 | Brooks et al. |
| 7,290,023 | B2 | 10/2007 | Dhong et al. |
| 11,175,891 | B2 | 11/2021 | Rubanovich et al. |
| 2002/0095451 | A1* | 7/2002 | Krygowski ............ G06F 7/483 708/204 |
| 2012/0011185 | A1 | 1/2012 | Mohamed et al. |
| 2018/0373533 | A1 | 12/2018 | Gschwind et al. |
| 2020/0348908 | A1 | 11/2020 | Schelm et al. |
| 2021/0042088 | A1 | 2/2021 | Mueller et al. |

OTHER PUBLICATIONS

G. Gerwig et al., "The IBM eServer z990 floating-point unit," in IBM Journal of Research and Development, vol. 48, No. 3.4, pp. 311-322, May 2004, doi: 10.1147/rd.483.0311. (Year: 2004).*

B. R. Sheikh and R. Manohar, "An Operand-Optimized Asynchronous IEEE 754 Double-Precision Floating-Point Adder," 2010 IEEE Symposium on Asynchronous Circuits and Systems, Grenoble, France, 2010, pp. 151-162, doi: 10.1109/ASYNC.2010.24. (Year: 2010).*

AWS, Hybrid Cloud with AWS, URL: https://aws.amazon.com/hybrid/?nc1=h_ls, printed Feb. 3, 2022, 19 pages.

Finney et al., Rounding IEEE Floating Point Results, IBM, An IP.com Prior Art Database Technical Disclosure, IP.com No. IPCOM000044048D, Original Publication Date: Oct. 1, 1984, IP.com Electronic Publication Date: Feb. 5, 2005, 4 pages.

IBM, IBM COBOL for Linux on x86, URL: https://www.ibm.com/products/cobol-compiler-linux-x86/details, printed Feb. 3, 2022, 12 pages.

Phil De Valence, Migrating a Mainframe to AWS in 5 Steps with Astadia, AWS Partner Network (APN) Blog, URL: https://aws.amazon.com/blogs/apn/migrating-a-mainframe-to-aws-in-5-steps/, dated Mar. 23, 2018, 6 pages.

Steuart et al., Coming Soon: The AWS Mainframe Migration Competency, AWS Partner Network (APN) Blog, URL: https://aws.amazon.com/blogs/apn/coming-soon-the-aws-mainframe-migration-competency/, dated Dec. 3, 2020, 4 pages.

International Search Report and Written Opinion, PCT/IB2023/052744, mailed Jun. 28, 2023, 6 pages.

* cited by examiner

| 0 | X | X | ... | 0 | 0 | 1 | 1 | 1 | 1 | 0 | 1 | 0 | 1 |
|---|---|---|-----|---|---|---|---|---|---|---|---|---|---|
| 0 | 1 | 2 | ... | 47 | 48 | 49 | 50 | 51 | 52 | 53 | 54 | 55 | 56 |

302

| 0 | X | X | ... | 0 | 0 | 1 | 1 | 1 | 1 | 0 | 1 | 1 | 0 |
|---|---|---|-----|---|---|---|---|---|---|---|---|---|---|
| 0 | 1 | 2 | ... | 47 | 48 | 49 | 50 | 51 | 52 | 53 | 54 | 55 | 56 |

| 0 | X | X | ... | 0 | 0 | 1 | 1 | 1 | 1 | 1 | 1 | 1 | 1 |
|---|---|---|-----|---|---|---|---|---|---|---|---|---|---|
| 0 | 1 | 2 | ... | 47 | 48 | 49 | 50 | 51 | 52 | 53 | 54 | 55 | 56 |

306

| 0 | X | X | ... | 0 | 1 | 0 | 0 | 0 | 0 | 0 | 0 | 0 | 0 |
|---|---|---|-----|---|---|---|---|---|---|---|---|---|---|
| 0 | 1 | 2 | ... | 47 | 48 | 49 | 50 | 51 | 52 | 53 | 54 | 55 | 56 |

ROUNDING HEXADECIMAL FLOATING POINT NUMBERS USING BINARY INCREMENTORS

BACKGROUND

Field of the Invention

The field of the invention is data processing, or, more specifically, methods, apparatus, and products for rounding hexadecimal floating point numbers using binary incrementors.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Programming languages such as COBOL use hexadecimal floating point formatting to encode floating point numbers. Existing COBOL implementations lack native implementations for rounding functions other than truncation (e.g., round toward zero). In order to work around these limitations, multiple COBOL operations are used in order to work around this limitation and perform other rounding operations.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 1A shows an example placement for incrementing and rounding decisions for hexadecimal floating point numbers according to some embodiments of the present disclosure.

FIG. 1B shows an example placement for incrementing and rounding decisions for hexadecimal floating point numbers according to some embodiments of the present disclosure.

FIG. 3A an example incrementing of a fraction component for rounding hexadecimal floating point numbers using binary incrementors according to some embodiments of the present disclosure.

FIG. 3B an example incrementing of a fraction component for rounding hexadecimal floating point numbers using binary incrementors according to some embodiments of the present disclosure.

DETAILED DESCRIPTION

Figure 2:
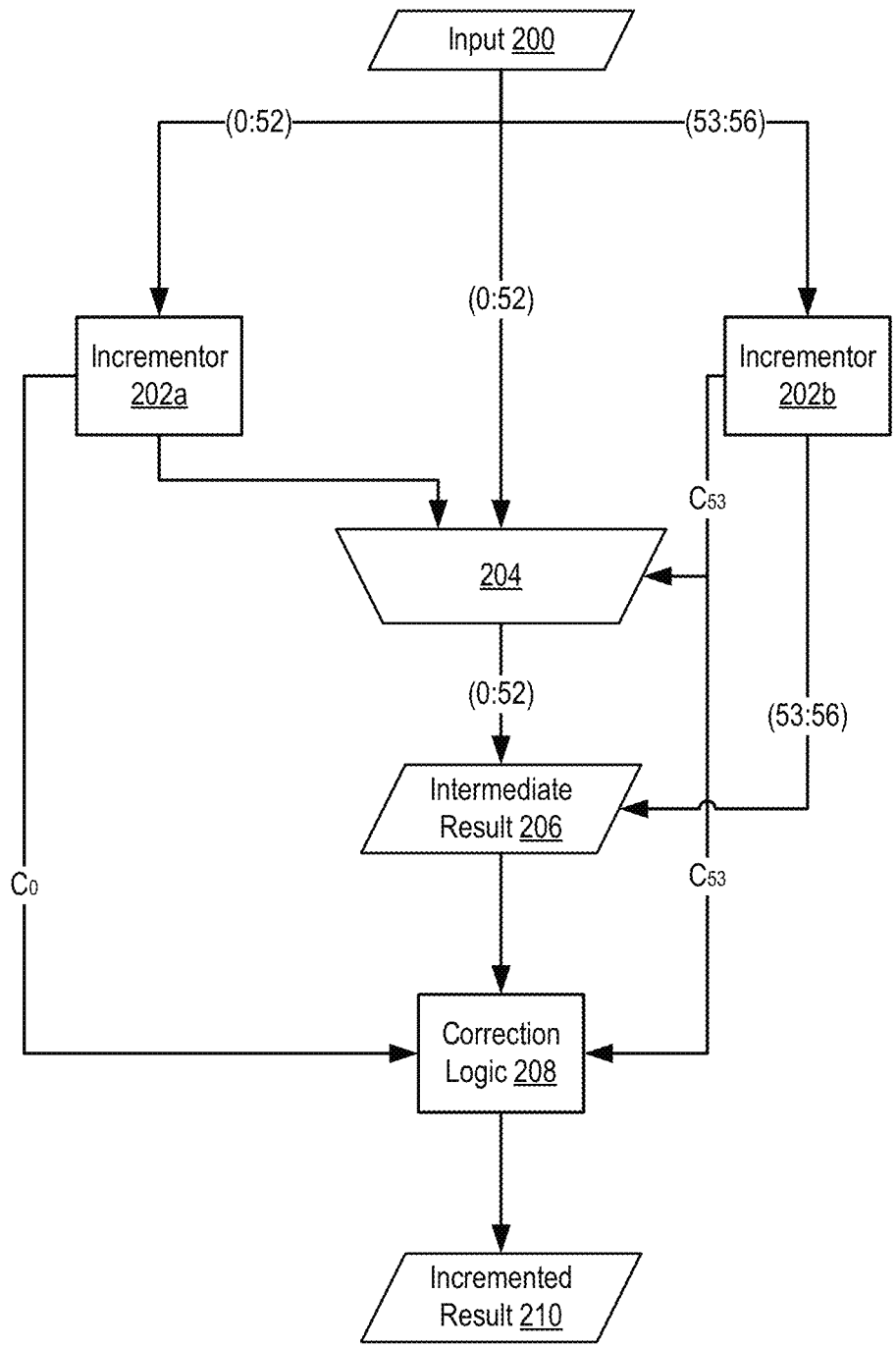
FIG. 2 shows a block diagram of an example logic flow for rounding hexadecimal floating point numbers using binary incrementors according to some embodiments of the present disclosure.

Programming languages such as COBOL use hexadecimal floating point formatting to encode floating point numbers. Existing COBOL implementations lack native implementations for rounding functions other than truncation (e.g., round toward zero). In order to work around these limitations, multiple COBOL operations (e.g., approximately fifteen operations) are used in order to work around this limitation and perform other rounding operations. Due to the large number of operations required, this approach is highly inefficient.

Figures 1A, 1B:
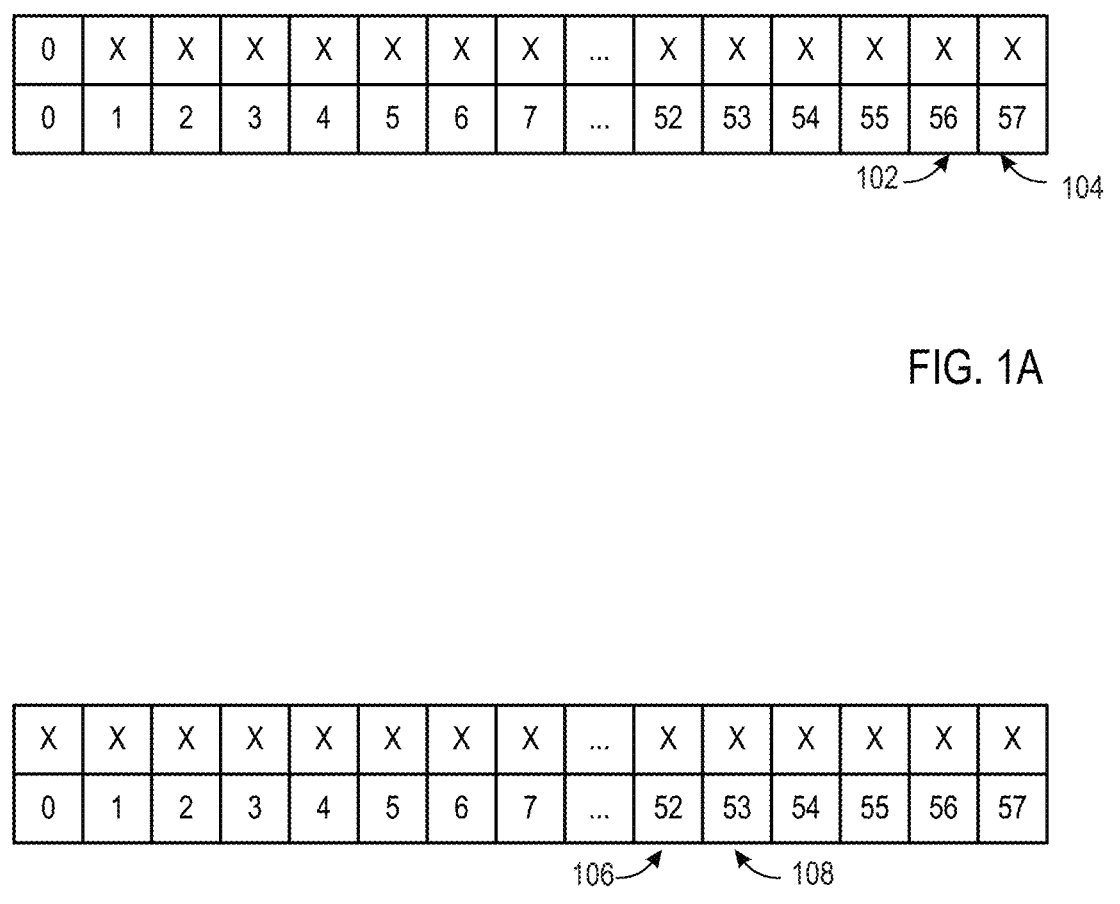

To address these concerns, methods, apparatus, and products for rounding hexadecimal floating point numbers using binary incrementors in accordance with the present invention are described with reference to the accompanying drawings, beginning with FIGS. 1A and 1B. FIGS. 1A and 1B show exemplary bit placements for performing incrementing and rounding decisions in a hexadecimal floating point number. A rounding operation includes two steps: a rounding decision and a conditional increment. The rounding decision and the conditional increment are performed on different subsets of bits of a fraction portion of the operand. Where the rounding decision determines that the operand should be rounded up, the conditionally incremented value is included in the result. For timing reasons, the conditional increment is computed at the same time as the rounding decision. Based on the result of the rounding decision, an incremented or non-incremented result is selected.

Before rounding a hexadecimal floating point operand, the operand must be normalized by removing any leading zeros. To do so, in some embodiments, a leading zero anticipator is used. Though faster than a leading zero counter, whereby each leading zero is individually counted prior to normalization, a leading zero anticipator may be off by one, resulting in a "leading zero too large" (e.g., "lz2lrg") error.

In order to perform rounding of the hexadecimal floating point operand, a portion of the operand is incremented to account for rounding up, while another portion of the operand is used to calculate the rounding decision. As the operand is susceptible to a lz2lrg error due to normalization, the bit indexes marking incrementing and the rounding decision may be offset by four bits, the number of bits used to encode a hexadecimal number, where the lz2lrg error occurs. For example, FIG. 1A shows an example listing of bit indices for a hexadecimal floating point number without an lz2lrg error. Here, the operand is incremented at index 56, indicated by item 102, and the rounding decision is performed with bits beginning at index 57, indicated by item 104. In contrast, as shown in FIG. 1B, where an lz2lrg error occurs, the operand should be incremented at index 52, shown by item 106, and the rounding decision should be performed beginning at index 53, shown by item 108. One skilled in the art will appreciate that the indices identified in FIGS. 1A and 1B and that, in some embodiments, the particular indices used may vary depending on the particular encoding of the hexadecimal floating point operand.

Accordingly, FIG. 2 sets forth an example logic flow for rounding hexadecimal floating point numbers using binary incrementors according to some embodiments of the present disclosure. The example logic flow may be implemented, for example, in a chip, semiconductor device, or other computational logic as can be appreciated. For example, such a chip may be implemented in a variety of computing devices, including servers, personal computers, mobile devices, set-top boxes, and the like.

As shown in FIG. 2, the example logic flow includes an input 200. The input 200 includes the fraction portion of a hexadecimal floating point operand. As an example, the input 200 includes a fifty-six-bit fraction portion of a hexadecimal double precision floating point operand. The example logic flow also includes two incrementors 202a, 202b. Each incrementer 202a, 202b increments an input binary value by one and provides, as output, an incremented result and a carryout. The carryout may be set or unset (e.g., high or low) if the result of incrementing causes a highest order bit of the incremented result to have a carryout.

As shown, input 200 bits from index zero to index fifty-two (shown using the notation (0:52) are provided to the incrementor 202a. Accordingly, in some embodiments, the incrementor 202a is a fifty-three-bit incrementor 202a that increments an input fifty-three-bit value. The incrementor 202b accepts, as input, the last four bits of the input 200 (e.g., bits (53:56)). Accordingly, in some embodiments, the incrementor 202b includes a four-bit incrementor 202b. One skilled in the art will appreciate that the use of incrementors 202a,b allows for the use of a fifty-three-bit binary incrementor 202a already used in various computational logic implementations (e.g., for rounding binary double precision floating point numbers), only requiring that a four-bit incrementor 202b to be added to the logic flow. One skilled in the art will also appreciate that the approaches described herein may be applicable to other encodings for hexadecimal floating point numbers, where an incrementor 202b may be used to accept the last four bits of a fraction component, while another incrementor accepts the remaining bits of the fraction.

The incremented output of the incrementor 202a is provided to a multiplexor 204 along with the unincremented bits (0:52) from the input 200. Thus, an incremented and unincremented value is provided to the multiplexor 204 with the carryout $C_{53}$ from the incrementor 202b being used to select which value to output. As is shown in FIGS. 3A and 3B, the carryout $C_{53}$ determines whether an intermediate result 206 should include the incremented or unincremented bits (0:52) from the input 200.

Input 302 includes a last four bits that, when incremented, would not result in a carryout (e.g., any last four bits other than "1111"). Accordingly, an intermediate value 304 would include the incremented last four bits (e.g., the output from the incrementor 202b) and the unincremented bits (0:52). In contrast, the input 306 of FIG. 3B includes a last four bits of "1111." When these bits are provided to the incrementor 202b, the result would have a carryout $C_{53}$ of "1." This causes the intermediate value 308 to include the incremented bits (0:52) (e.g., the output from the incrementor 202a) and the output of the incrementor 202b.

After calculating the intermediate result 206, the intermediate result 206 should be corrected in order to account for an lz2lrg error where present. Also, where the intermediate result 206 includes an overflow, the intermediate result 206 should be shifted and the exponent component of the operand incremented to account for the overflow. These operations are performed by correction logic 208 to produce the incremented result 210.

The incremented result 210 is a hexadecimal floating point number that is an incremented version of the operand from which the input 200 fraction component was selected. Accordingly, the incremented result 210 includes a fraction component and an exponent component. The correction logic 208 accepts, as input, the carryout $C_{53}$ from the incrementor 202b, the carryout $C_0$ from the incrementor 202a, and the intermediate result 206. Where $C_{53}$ and $C_0$ are both set (e.g., equal to "1"), the fraction component of the incremented result 210 is equal to "001" appended to the front (e.g., as the highest order bits) of bits (0:52) of the intermediate result 206. An exponent component of the operand is incremented in order to calculate the exponent component of the incremented result 210. This effectively shifts out bits (53:56) to account for an lz2lrg error and accounts for an overflow.

Where $C_0$ is not set and a first bit of the intermediate result 206 (e.g., bit (0)) is set, the fraction component of the incremented result 210 is equal to "000" appended to the front (e.g., as the highest order bits) of bits (0:52) of the intermediate result 206. An exponent component of the operand is incremented in order to calculate the exponent component of the incremented result 210. This effectively shifts out bits (53:56) to account for an lz2lrg error without overflow. Where $C_0$ is not set and a first bit of the intermediate result 206 (e.g., bit (0)) is not set, indicating no lz2lrg error and no overflow, the fraction component of the incremented result 210 is equal to bits (1:56) of the intermediate result 206. As is set forth above, each of the possible fraction components of the incremented result 210 is expressed as a fifty-six-bit value. The incremented result 210 and the original, incremented operand may then each be conditionally selected as an output of a rounding operation based on a rounding decision.

As described above, bit values of "000" or "001" may be appended to the front of an incremented result 210 under certain conditions. Where there is an lz2lrg error, the fifty-six bit fraction portion is effectively delivered in bits (−3:52). As it is known (by virtue of the construction of the leading zero anticipator) that the first three bits are leading zeros, only bits (0:52) of the intermediate result 206 need be used. Thus, "001" or "000" are appended depending on if a carry out is or is not present, respectively. In contrast, where no lz2lrg error is present, bits (1:56) of the intermediate result 206 deliver the fraction portion of the incremented result 210.

One skilled in the art will appreciate that the approaches described herein for rounding hexadecimal floating point numbers using binary incrementors allow for rounding of a hexadecimal floating point number using existing incrementors (e.g., a fifty-three-bit incrementor 202a) with an additional four-bit incrementor 202b.

Rounding hexadecimal floating point numbers using binary incrementors in accordance with the present application is generally implemented with computers, that is, with automated computing machinery. For further explanation, therefore, FIG. 4 sets forth a block diagram of computing machinery including an exemplary computer 400 configured for rounding hexadecimal floating point numbers using binary incrementors according to certain embodiments. The computer 400 of FIG. 4 includes at least one computer processor 402 or 'CPU' as well as random access memory 404 ('RAM') which is connected through a high speed memory bus 406 and bus adapter 408 to processor 402 and to other components of the computer 400.

Stored in RAM 404 is an operating system 410. Operating systems useful in computers configured for rounding hexadecimal floating point numbers using binary incrementors according to certain embodiments include UNIX™, Linux™, Microsoft Windows™, and others as will occur to those of skill in the art. The operating system 410 in the example of FIG. 4 is shown in RAM 404, but many components of such software typically are stored in nonvolatile memory also, such as, for example, on data storage 412, such as a disk drive.

Figure 4:
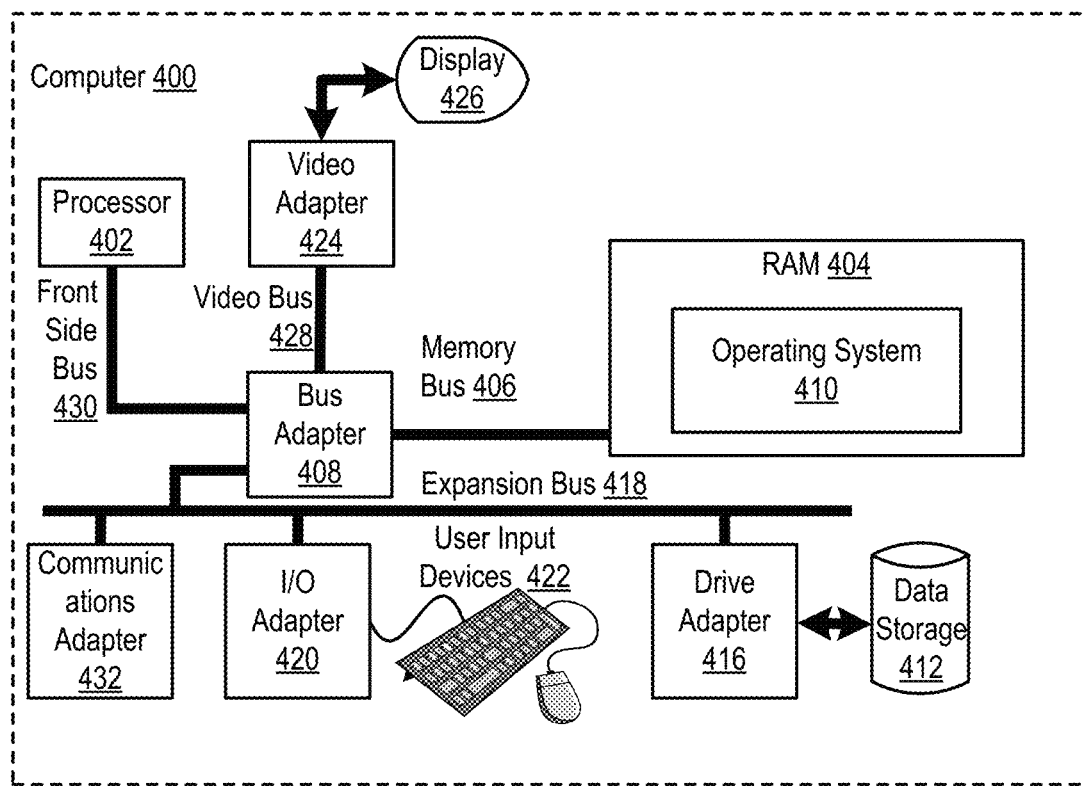
FIG. 4 shows a block diagram of an example computer for rounding hexadecimal floating point numbers using binary incrementors according to some embodiments of the present disclosure.

The computer 400 of FIG. 4 includes disk drive adapter 416 coupled through expansion bus 418 and bus adapter 408 to processor 402 and other components of the computer 400. Disk drive adapter 416 connects non-volatile data storage to the computer 400 in the form of data storage 412. Disk drive adapters useful in computers configured for rounding hexadecimal floating point numbers using binary incrementors according to certain embodiments include Integrated Drive Electronics ('IDE') adapters, Small Computer System Interface ('SCSI') adapters, and others as will occur to those of skill in the art. In some embodiments, non-volatile computer memory is implemented as an optical disk drive, electrically erasable programmable read-only memory (so-called 'EEPROM' or 'Flash' memory), RAM drives, and so on, as will occur to those of skill in the art.

The example computer 400 of FIG. 4 includes one or more input/output ('I/O') adapters 420. I/O adapters implement user-oriented input/output through, for example, software drivers and computer hardware for controlling output to display devices such as computer display screens, as well as user input from user input devices 422 such as keyboards and mice. The example computer 400 of FIG. 4 includes a video adapter 424, which is an example of an I/O adapter specially designed for graphic output to a display device 426 such as a display screen or computer monitor. Video adapter 424 is connected to processor 402 through a high speed video bus 428, bus adapter 408, and the front side bus 430, which is also a high speed bus.

The exemplary computer 400 of FIG. 4 includes a communications adapter 432 for data communications with other computers and for data communications with a data communications network. Such data communications are carried out serially through RS-232 connections, through external buses such as a Universal Serial Bus ('USB'), through data communications networks such as IP data communications networks, and/or in other ways as will occur to those of skill in the art. Communications adapters implement the hardware level of data communications through which one computer sends data communications to another computer, directly or through a data communications network. Examples of communications adapters useful in computers configured for rounding hexadecimal floating point numbers using binary incrementors according to certain embodiments include modems for wired dial-up communications, Ethernet (IEEE 802.3) adapters for wired data communications, and 802.11 adapters for wireless data communications.

Figure 5:
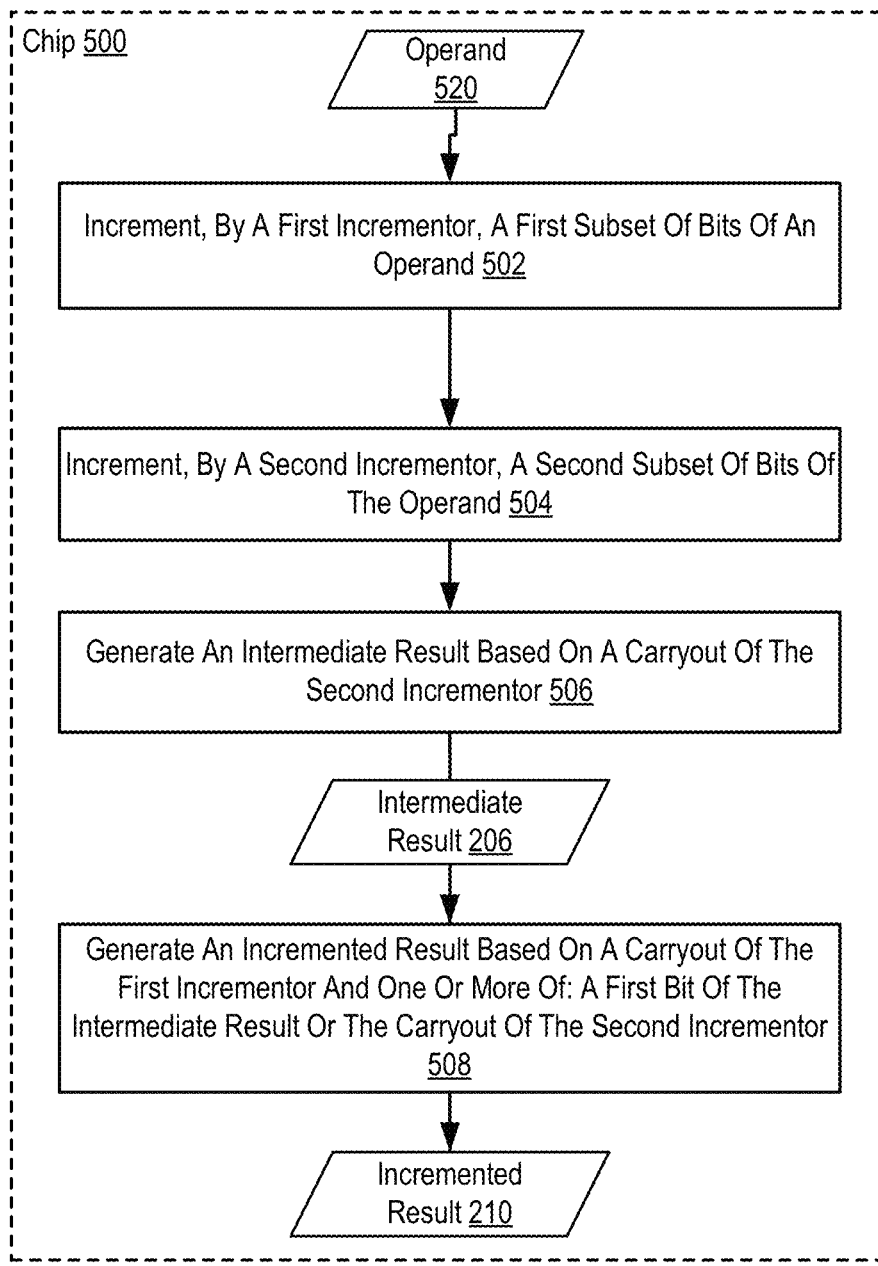
FIG. 5 shows a flowchart of an example method for rounding hexadecimal floating point numbers using binary incrementors according to some embodiments of the present disclosure.

For further explanation, FIG. 5 shows a flowchart of an example method for rounding hexadecimal floating point numbers using binary incrementors according to some embodiments of the present disclosure. The method of FIG. 5 may be performed, for example, by a chip 500 implementing a logic flow similar to that of FIG. 2. The method of FIG. 5 includes incrementing 502, by a first incrementor 202a, a first subset of bits of an operand 520. The operand 520 is a hexadecimal floating point number. In some embodiments, the first subset of bits may include, for example, a highest order subset of bits of a fraction component of the operand 520 (e.g., bits (0:52)).

The method of FIG. 5 also includes incrementing 504, by a second incrementor 202b, a second subset of bits of the operand. In some embodiments, the second subset of bits includes those bits of the fraction component of the operand 520 other than the first subset of bits. In other words, the second subset of bits includes the lowest order bits of the fraction component. As an example, the second subset of bits includes a four lowest order bits of the fraction component of the operand 520.

The method of FIG. 5 also includes generating 506 an intermediate result 206 based on a carryout $C_{53}$ of the second incrementor 202b. As will be described in further detail below, the intermediate result 206 may include a subset of bits corresponding to the first subset of bits of the operand 520. The intermediate result 206 will include an incremented (as output by the incrementor 202a) or unincremented version of the first subset of bits depending on the carryout $C_{53}$. As will also be described in further detail below, the intermediate result 206 will include the output of the second incrementor 202b.

The method of FIG. 5 also includes generating 508 an incremented result 210 based on a carryout of the first incrementor 202a (e.g., $C_0$) and one or more of: a first bit of the intermediate result 206 or a carryout of the second incrementor 202b (e.g., $C_{53}$). As will be described in further detail below, the fraction component of the incremented result 210 may be selected as a subset of bits of the intermediate result 206. In order to account for lz2lrg errors and overflows, the exponent component of the incremented result 210 may be incremented depending on particular factors.

One skilled in the art will appreciate that, after calculating the incremented result 210, the incremented result 210 and operand 520 may be each conditionally selected as an output of a rounding function depending on a rounding decision applied to the operand 520.

Figure 6:
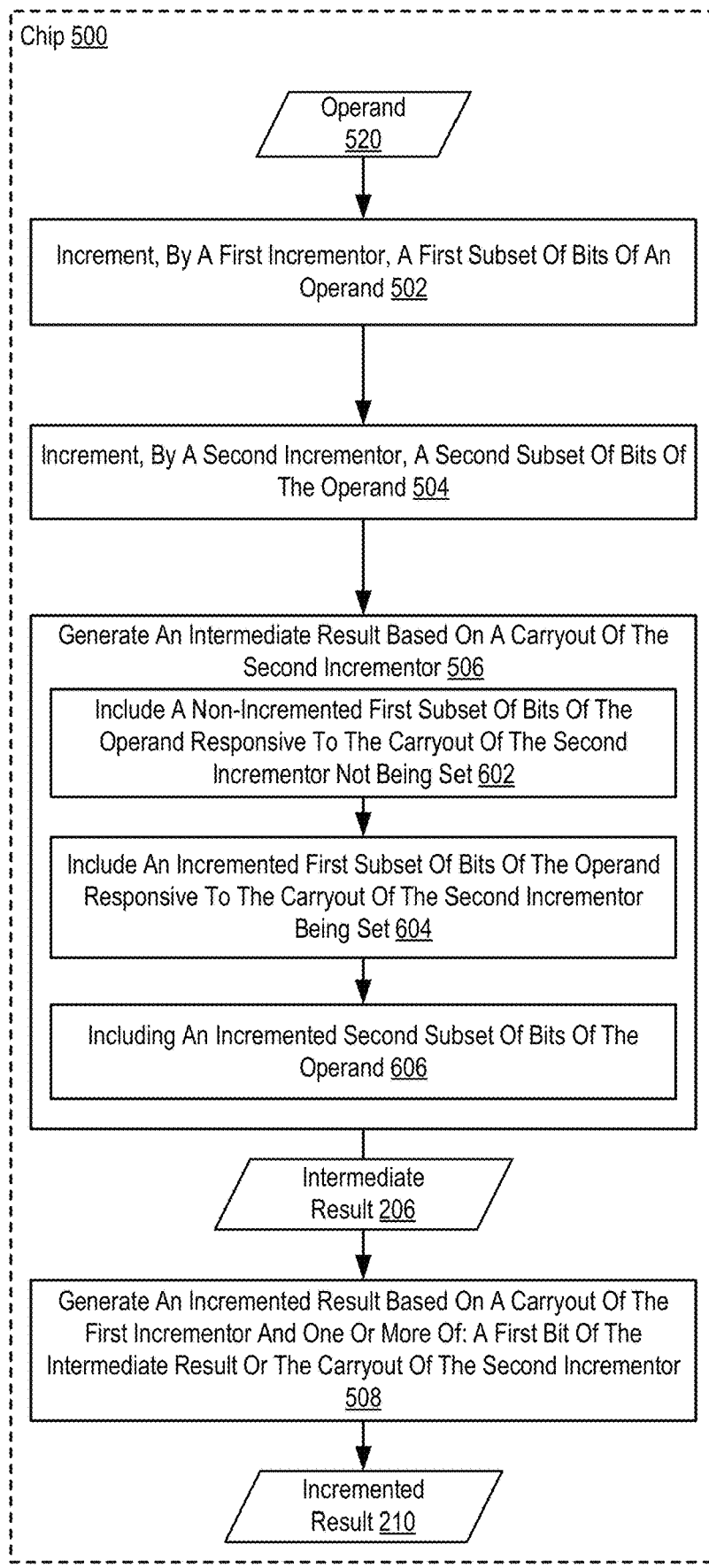
FIG. 6 shows a flowchart of another example method for rounding hexadecimal floating point numbers using binary incrementors

For further explanation, FIG. 6 sets forth a flowchart of another example method for rounding hexadecimal floating point numbers using binary incrementors according to some embodiments of the present disclosure. The method of FIG. 6 is similar to FIG. 5 in that the method of FIG. 6 includes: incrementing 502, by a first incrementor 202a, a first subset of bits of an operand 520; incrementing 504, by a second incrementor 202b, a second subset of bits of the operand 520; generating 506 an intermediate result 206 based on a carryout of the second incrementor 202b; and generating 508 an incremented result 210 based on a carryout of the first incrementor 202a and one or more of: a first bit of the intermediate result 206 or the carryout of the second incrementor 202b.

The method of FIG. 6 differs from FIG. 5 in that generating 506 the intermediate result 206 includes including 602 (e.g., in the intermediate result) a non-incremented first subset of bits of the operand 520 responsive to the carryout of the second incrementor 202b (e.g., $C_{53}$) not being set.

Thus, when the carryout of the second incrementor 202b is not set, the highest order bits of the intermediate result 206 (e.g., bits (0:52)) are equal to the input to the first incrementor 202a (e.g., without incrementing).

Generating 506 the intermediate result 206 also includes including 604 (e.g., in the intermediate result) an incremented first subset of bits of the operand 520 responsive to the carryout of the second incrementor 202b (e.g., $C_{53}$) being set. Thus, when the carryout of the second incrementor 202b is set, the highest order bits of the intermediate result 206 (e.g., bits (0:52)) are equal to the output of the first incrementor 202a.

Generating 506 the intermediate result 206 also includes including 606 (e.g., in the intermediate result) an incremented second subset of bits of the operand 520 (e.g., the output of the second incrementor 202b. Thus, independent of the carryout of the second incrementor 202b, the lowest order bits of the intermediate result 206 (e.g., bits (53:56)) are equal to the output of the second incrementor 202b.

Figure 7:
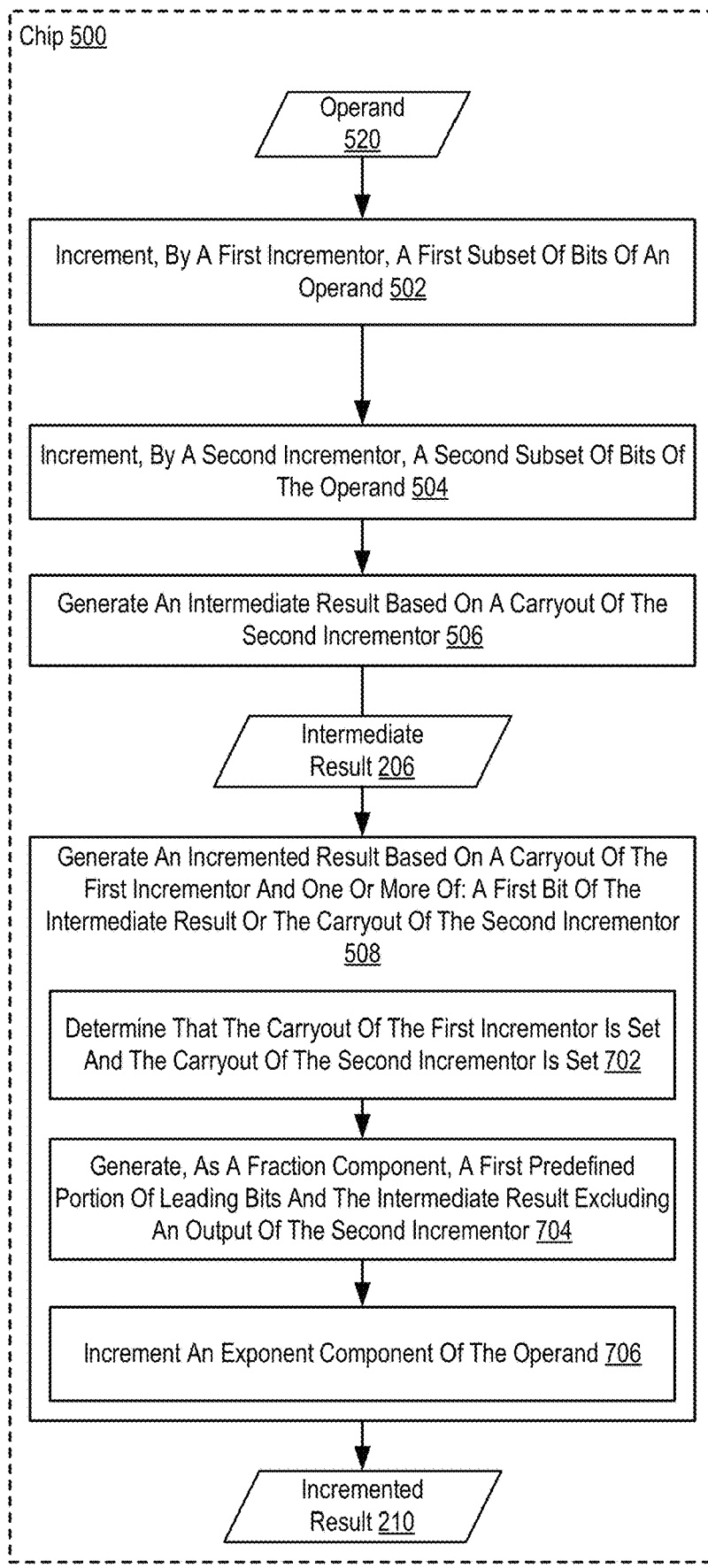
FIG. 7 shows a flowchart of another example method for rounding hexadecimal floating point numbers using binary incrementors
Figure 8:
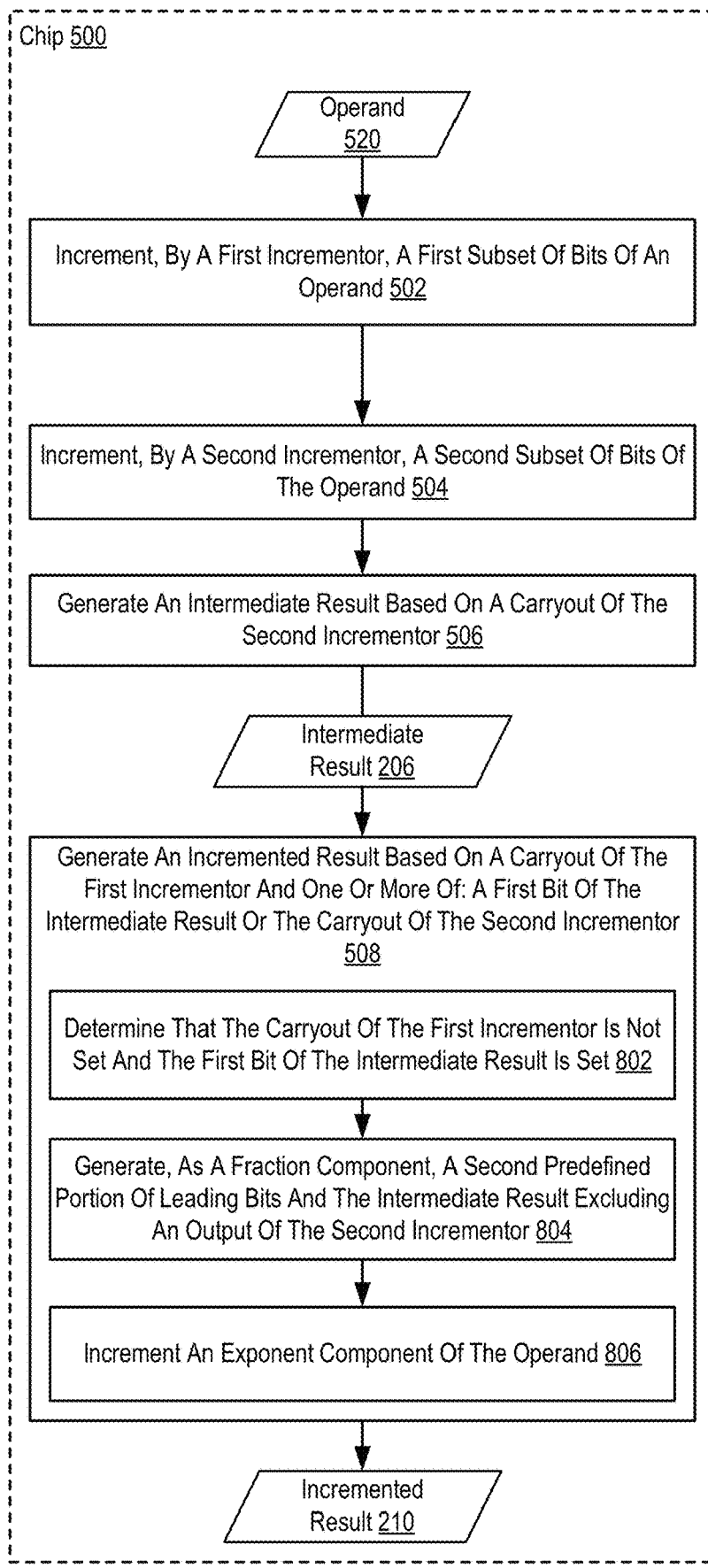
FIG. 8 shows a flowchart of another example method for rounding hexadecimal floating point numbers using binary incrementors
Figure 9:
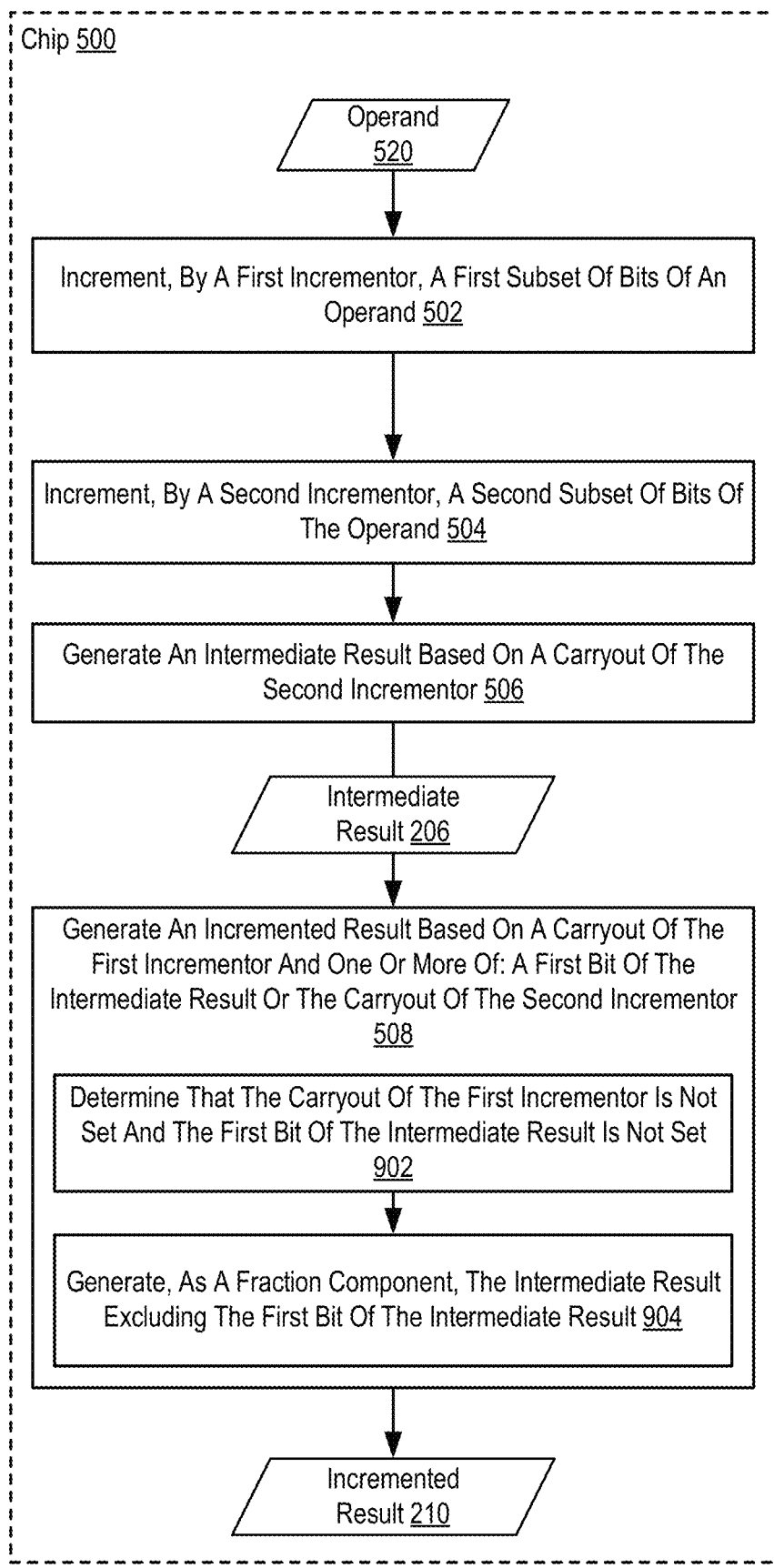
FIG. 9 shows a flowchart of another example method for rounding hexadecimal floating point numbers using binary incrementors

For further explanation, FIG. 7 sets forth a flowchart of another example method for rounding hexadecimal floating point numbers using binary incrementors according to some embodiments of the present disclosure. Particularly, FIGS. 7-9 describe various conditional operations for generating 508 the incremented result. Accordingly, though FIGS. 7-9 are shown as separate flowcharts for clarity, one skilled in the art will appreciate that the approaches set forth in FIGS. 7-9 may be used in combination with each other, in addition to in combination with FIGS. 5 and 6.

The method of FIG. 7 is similar to FIG. 5 in that the method of FIG. 7 includes: incrementing 502, by a first incrementor 202a, a first subset of bits of an operand 520; incrementing 504, by a second incrementor 202b, a second subset of bits of the operand 520; generating 506 an intermediate result 206 based on a carryout of the second incrementor 202b; and generating 508 an incremented result 210 based on a carryout of the first incrementor 202a and one or more of: a first bit of the intermediate result 206 or the carryout of the second incrementor 202b.

The method of FIG. 7 differs from FIG. 5 in that generating 508 the incremented result 210 includes determining 702 that the carryout of the first incrementor 202a (e.g., $C_O$) is set and the carryout of the second incrementor 202b (e.g., $C_{53}$) is set. Generating 508 the incremented result 210 also includes generating 704 (e.g., responsive to $C_{53}$ and $C_O$ being set), as a fraction component (e.g., of the incremented result 210) a first predefined portion of leading bits and the intermediate result excluding an output of the second incrementor 202b. As an example, the first predefined portion of leading bits includes "001," onto which the remaining bits (e.g., the intermediate result 206 excluding the output of the second incrementor 202b, bits (0:52) of the intermediate result 206) are appended.

Generating 508 the incremented result 210 also includes incrementing 706 (e.g., responsive to $C_{53}$ and $C_O$ being set) an exponent component of the operand 520. Thus, the exponent component of the incremented result 210 is equal to an incremented exponent component of the operand 520.

For further explanation, FIG. 8 sets forth a flowchart of another example method for rounding hexadecimal floating point numbers using binary incrementors according to some embodiments of the present disclosure. The method of FIG. 8 is similar to FIG. 5 in that the method of FIG. 8 includes: incrementing 502, by a first incrementor 202a, a first subset of bits of an operand 520; incrementing 504, by a second incrementor 202b, a second subset of bits of the operand 520; generating 506 an intermediate result 206 based on a carryout of the second incrementor 202b; and generating 508 an incremented result 210 based on a carryout of the first incrementor 202a and one or more of: a first bit of the intermediate result 206 or the carryout of the second incrementor 202b.

The method of FIG. 8 differs from FIG. 5 in that generating 508 the incremented result 210 includes determining 802 that the carryout of the first incrementor 202a (e.g., $C_O$) is not set and the first bit of the intermediate result 206 (e.g., bit (0)) is set. Generating 508 the incremented result 210 also includes generating 804 (e.g., responsive to $C_O$ not being set and the first bit of the intermediate result 206 being set), as a fraction component (e.g., of the incremented result 210) a second predefined portion of leading bits and the intermediate result excluding an output of the second incrementor 202b. As an example, the second predefined portion of leading bits includes "000," onto which the remaining bits (e.g., the intermediate result 206 excluding the output of the second incrementor 202b, bits (0:52) of the intermediate result 206) are appended.

Generating 508 the incremented result 210 also includes incrementing 806 (e.g., responsive to $C_O$ not being set and the first bit of the intermediate result 206 being set) an exponent component of the operand 520. Thus, the exponent component of the incremented result 210 is equal to an incremented exponent component of the operand 520.

For further explanation, FIG. 9 sets forth a flowchart of another example method for rounding hexadecimal floating point numbers using binary incrementors according to some embodiments of the present disclosure. The method of FIG. 9 is similar to FIG. 5 in that the method of FIG. 9 includes: incrementing 502, by a first incrementor 202a, a first subset of bits of an operand 520; incrementing 504, by a second incrementor 202b, a second subset of bits of the operand 520; generating 506 an intermediate result 206 based on a carryout of the second incrementor 202b; and generating 508 an incremented result 210 based on a carryout of the first incrementor 202a and one or more of: a first bit of the intermediate result 206 or the carryout of the second incrementor 202b.

The method of FIG. 9 differs from FIG. 5 in that generating 508 the incremented result 210 includes determining 902 that the carryout of the first incrementor 202a (e.g., $C_O$) is not set and the first bit of the intermediate result 206 (e.g., bit (0)) is not set. Generating 508 the incremented result 210 also includes generating 904 (e.g., responsive to $C_O$ not being set and the first bit of the intermediate result 206 being not set), as a fraction component (e.g., of the incremented result 210) the intermediate result 206 excluding the first bit of the intermediate result 206. Thus, the fraction component of the incremented result 210 is equal to bits (1:56) of the intermediate result 206.

In view of the explanations set forth above, readers will recognize that the benefits of rounding hexadecimal floating point numbers using binary incrementors according to embodiments of the present invention include improved performance of a computing system by allowing for efficient rounding of a hexadecimal floating point number using an existing fifty-three-bit incrementor.

Exemplary embodiments of the present invention are described largely in the context of a fully functional computer system for rounding hexadecimal floating point numbers using binary incrementors. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of rounding hexadecimal floating point numbers using binary incrementors, the method comprising:
   incrementing, by a first incrementor, a first subset of bits of an operand comprising a binary hexadecimal floating point operand;
   incrementing, by a second incrementor, a second subset of bits of the operand;
   generating, by a multiplexor, an intermediate result based on a carryout of the second incrementor;
   generating, by correction logic if a carryout of the first incrementor is set, an incremented result based on the carryout of the first incrementor and one or more of: a first bit of the intermediate result or the carryout of the second incrementor; and
   generating, by the correction logic if the carryout of the first incrementor is not set, the incremented result based on whether the first bit of the intermediate result is set.

2. The method of claim 1, wherein generating the intermediate result comprises:
   including, in the intermediate result, a non-incremented first subset of bits of the operand responsive to the carryout of the second incrementor not being set;
   including, in the intermediate result, an incremented first subset of bits of the operand responsive to the carryout of the second incrementor being set; and
   including, in the intermediate result, an incremented second subset of bits of the operand.

3. The method of claim 1, wherein generating the incremented result comprises:
   responsive to the carryout of the first incrementor being set and the carryout of the second incrementor being set:
      generating, as a fraction component of the incremented result, a first predefined portion of leading bits and the intermediate result excluding an output of the second incrementor; and
      incrementing an exponent component of the operand.

4. The method of claim 1, wherein generating the incremented result comprises:
   responsive to the carryout of the first incrementor not being set and the first bit of the intermediate result being set:
      generating, as a fraction component of the incremented result, a second predefined portion of leading bits and the intermediate result excluding an output of the second incrementor; and
      incrementing an exponent component of the operand.

5. The method of claim 1, wherein generating the incremented result comprises:
   responsive to the carryout of the first incrementor not being set and the first bit of the intermediate result not being set, generating, as a fraction component of the incremented result, the intermediate result excluding the first bit of the intermediate result.

6. The method of claim 1, wherein the second subset of bits of the operand comprises a four least significant bits of the operand.

7. The method of claim 6, wherein the second incrementor comprises a four-bit incrementor.

8. The method of claim 1, wherein the first incrementor comprises a fifty-three-bit incrementor.

9. A chip for rounding hexadecimal floating point numbers using binary incrementors, comprising:
   a first incrementor;
   a second incrementor;
   correction logic; and
   a multiplexor, wherein:
      the first incrementor increments a first subset of bits of an operand comprising a binary hexadecimal floating point operand;
      the second incrementor increments a second subset of bits of the operand;
      the multiplexor receives a non-incremented first subset of bits and the incremented first subset of bits and generates an intermediate result based on a carryout of the second incrementor;
      the correction logic generates an incremented result if a carryout of the first incrementor is set based on the carryout of the first incrementor and one or more of: a first bit of the intermediate result or the carryout of the second incrementor; and
      the correction logic generates the incremented result if the carryout of the first incrementor is not set based on whether the first bit of the intermediate result is set.

10. The chip of claim 9, wherein the multiplexor generates the intermediate result by:
    including, in the intermediate result, the non-incremented first subset of bits of the operand responsive to the carryout of the second incrementor not being set;
    including, in the intermediate result, the incremented first subset of bits of the operand responsive to the carryout of the second incrementor being set; and
    including, in the intermediate result, the incremented second subset of bits of the operand.

11. The chip of claim 9, wherein the correction logic generates the incremented result by:
    responsive to the carryout of the first incrementor being set and the carryout of the second incrementor being set:
       generating, as a fraction component of the incremented result, a first predefined portion of leading bits and the intermediate result excluding an output of the second incrementor; and
       incrementing an exponent component of the operand.

12. The chip of claim 9, wherein the correction logic generates the incremented result by:
    responsive to the carryout of the first incrementor not being set and the first bit of the intermediate result being set:
       generating, as a fraction component of the incremented result, a second predefined portion of leading bits and the intermediate result excluding an output of the second incrementor; and
       incrementing an exponent component of the operand.

13. The chip of claim 9, wherein the correction logic generates the incremented result by:
responsive to the carryout of the first incrementor not being set and the first bit of the intermediate result not being set, generating, as a fraction component of the incremented result, the intermediate result excluding the first bit of the intermediate result.

14. The chip of claim 9, wherein the second subset of bits of the operand comprises a four least significant bits of the operand.

15. The chip of claim 14, wherein the second incrementor comprises a four-bit incrementor.

16. The chip of claim 9, wherein the first incrementor comprises a fifty-three-bit incrementor.

17. An apparatus for comprising:
a processor; and
memory coupled to the processor, wherein the processor comprises:
a first incrementor;
a second incrementor;
correction logic; and
a multiplexor, and wherein:
the first incrementor increments a first subset of bits of an operand comprising a binary hexadecimal floating point operand;
the second incrementor increments a second subset of bits of the operand;
the multiplexor receives a non-incremented first subset of bits and the incremented first subset of bits and generates an intermediate result based on a carryout of the second incrementor;
the correction logic generates an incremented result if a carryout of the first incrementor is set based on the carryout of the first incrementor and one or more of: a first bit of the intermediate result or the carryout of the second incrementor; and
the correction logic generates the incremented result if the carryout of the first incrementor is not set based on whether the first bit of the intermediate result is set.

18. The apparatus of claim 17, wherein the multiplexor generates the intermediate result by:
including, in the intermediate result, the non-incremented first subset of bits of the operand responsive to the carryout of the second incrementor not being set;
including, in the intermediate result, the incremented first subset of bits of the operand responsive to the carryout of the second incrementor being set; and
including, in the intermediate result, the incremented second subset of bits of the operand.

19. The apparatus of claim 17, wherein the correction logic generates the incremented result by:
responsive to the carryout of the first incrementor being set and the carryout of the second incrementor being set:
generating, as a fraction component of the incremented result, a first predefined portion of leading bits and the intermediate result excluding an output of the second incrementor; and
incrementing an exponent component of the operand.

20. The apparatus of claim 17, wherein the correction logic generates the incremented result by:
responsive to the carryout of the first incrementor not being set and the first bit of the intermediate result being set:
generating, as a fraction component of the incremented result, a second predefined portion of leading bits and the intermediate result excluding an output of the second incrementor; and
incrementing an exponent component of the operand.

* * * * *